(12) United States Patent
Zhang et al.

(10) Patent No.: US 10,063,547 B2
(45) Date of Patent: Aug. 28, 2018

(54) AUTHORIZATION AUTHENTICATION METHOD AND APPARATUS

(71) Applicant: TENCENT TECHNOLOGY (SHENZHEN) COMPANY LIMITED, Shenzhen (CN)

(72) Inventors: Xiaolong Zhang, Shenzhen (CN); Bin Zhang, Shenzhen (CN); Yuetong Mai, Shenzhen (CN); Runda Cai, Shenzhen (CN); Jisheng Huang, Shenzhen (CN); Kunfeng Rong, Shenzhen (CN); Sixin Gu, Shenzhen (CN); Yi Duan, Shenzhen (CN); Linping Tang, Shenzhen (CN); Wa Ye, Shenzhen (CN); Xixi Wang, Shenzhen (CN); Hongyang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/642,829

(22) Filed: Mar. 10, 2015

(65) Prior Publication Data

US 2015/0180870 A1 Jun. 25, 2015

Related U.S. Application Data

(63) Continuation of application No. PCT/CN2013/076566, filed on May 31, 2013.

(30) Foreign Application Priority Data

Apr. 28, 2013 (CN) .......................... 2013 1 0156187

(51) Int. Cl.
 *H04L 29/06* (2006.01)

(52) U.S. Cl.
 CPC ...... *H04L 63/0884* (2013.01); *H04L 63/0807* (2013.01); *H04L 63/10* (2013.01)

(58) Field of Classification Search
 CPC .... H04L 63/08–63/0846; H04L 67/306; H04L 63/0884; H04L 63/10; G06F 21/31
 See application file for complete search history.

(56) References Cited

U.S. PATENT DOCUMENTS

| | | | |
|---|---|---|---|
| 2009/0119763 A1* | 5/2009 | Park | ..................... H04L 63/0815 726/8 |
| 2012/0159169 A1 | 6/2012 | Lai et al. | |

(Continued)

FOREIGN PATENT DOCUMENTS

| | | |
|---|---|---|
| CN | 1886995 A | 12/2006 |
| CN | 101202753 A | 6/2008 |

(Continued)

OTHER PUBLICATIONS

Hardt. "The OAuth 2.0 Authorization Framework", Internet Engineering Task Force (IETF), Request for Comments: 6749, ISSN: 2070-1721. Published: Oct. 2012.*

(Continued)

*Primary Examiner* — Kevin Bechtel
(74) *Attorney, Agent, or Firm* — Sughrue Mion, PLLC

(57) ABSTRACT

A third-party application client performs authorization authentication with a user client and a platform server. The third party application obtains an access token and an open ID. The third-party application client interacts with the platform server for information related to the user ID by using the token, calls the user client or is called by the user client according to the open ID. The third-party application client may interact with the platform server for the information related to the user ID by using the token, so that other resources or information of the user accumulated for the (Continued)

platform server can be used by the third-party application client continuously.

17 Claims, 11 Drawing Sheets

(56) References Cited

U.S. PATENT DOCUMENTS

| | | |
|---|---|---|
| 2013/0019295 A1 | 1/2013 | Park et al. |
| 2013/0054968 A1* | 2/2013 | Gupta |
| 2013/0139241 A1* | 5/2013 | Leeder .................. H04W 12/06 726/9 |
| 2013/0331179 A1* | 12/2013 | Taylor ..................... G06Q 10/10 463/29 |
| 2014/0310151 A1* | 10/2014 | Shishkov ............. G06Q 40/025 705/38 |

FOREIGN PATENT DOCUMENTS

| | | |
|---|---|---|
| CN | 102413464 A | 4/2012 |
| CN | 102710640 A | 10/2012 |
| CN | 102724204 A | 10/2012 |
| CN | 102857408 A | 1/2013 |
| CN | 103037312 A | 4/2013 |
| CN | 103051630 A | 4/2013 |
| JP | 2008059038 A | 3/2008 |
| JP | 2012103848 A | 5/2012 |
| JP | 2013503512 A | 1/2013 |
| JP | 2013508831 A | 3/2013 |
| WO | 2011047722 A1 | 4/2011 |
| WO | 2012/069263 A2 | 5/2012 |

OTHER PUBLICATIONS

International Perliminary Report for Application No. PCT/2013/076566 dated Nov. 12, 2015.
Chinese Office Action for Application No. 201310156187X dated Sep. 7, 2015, and an English concise explanation of relevance thereof.
International Search Report for International Application No. PCT/CN2013/076566 dated Feb. 6, 2014.
Ogawa, Katsuhiro "Manner of Utilization for Seasonal WebAPI Using PHP", Nikkei Software, Jun. 2011.
Japanese Office Action for Application No. 2016-509253 dated Apr. 5, 2016, and an English translation thereof.

* cited by examiner

| application ID | user ID | open ID | access token | interface calling |
|---|---|---|---|---|
| application ID1 | user ID1 | open ID1 | token1 | permission 1 |
| | | | | interface calling permission 2 |
| | | | | interface calling permission 3 |
| application ID application ID1 | user ID user ID2 | open ID open ID2 | access token token2 | interface calling permission 1 |
| | | | | interface calling permission 2 |

AUTHORIZATION AUTHENTICATION METHOD AND APPARATUS

CROSS-REFERENCE TO RELATED APPLICATIONS

This application is a continuation of International Application No. PCT/CN2013/076566 filed on May 31, 2013. This application claims the benefit and priority of Chinese Application No. 201310156187.X filed Apr. 28, 2013. The entire disclosures of each of the above applications are incorporated herein by reference.

FIELD

The present disclosure relates to an authorization authentication method and apparatus.

BACKGROUND

This section provides background information related to the present disclosure which is not necessarily prior art.

Along with the developments of Internet technologies, different service providers have made various services available, such as e-mail, Instant Messaging (IM) services, social networking and, resource downloads, etc.

When using Internet services, the user usually needs to log on to a server of the service provider by using a registered user name and password. When there are multiple service providers, the user has to perform multiple registering procedures. Hence, service provider A may authorize service provider B to use the registered user name and password of the user via an open platform mode, so that the user may use the same registered user name and password when logging on to different service providers. For example, service provider A that provides "XX MicroBlog" services may authorize service provider B that providers "XX forum" to use a MicroBlog account and password of the user if service provider A is permitted by the user, so that the user does not need to register for the "XX forum", and may log on the "XX forum" by using the MicroBlog account and password which are registered for "XX MicroBlog", and use the services provided by the "XX forum".

The above-described systems have the following limits. After service provider A authorizes service provider B to use the registered user name and password, the user may directly log on to the service provider B, and only the registering operations are omitted. The whole authorization authentication procedure is terminated and other accumulated resources or information of the user for service provider A cannot be used by service provider B continuously.

SUMMARY

This section provides a general summary of the disclosure, and is not a comprehensive disclosure of its full scope or all of its features.

Various embodiments of the present disclosure provide authorization authentication methods and apparatuses, to address that only the registering operations are omitted and other accumulated resources or information of the user for service provider A cannot be used continuously. Technical solutions are implemented as follows.

In various embodiments, a method for logging on to a third-party application comprises the following:

sending an authorization request to a user client, the authorization request carrying an application identifier (ID) of the third-party application client, so that the user client sends the application ID and a user ID to a platform server after obtaining an authorization instruction;

receiving an authorization code sent by the platform server, the authorization code being sent by the platform server to the user client according to the application ID and the user ID, and being transmitted to the third-party application client by the user client;

sending the application ID and the authorization code to the platform server, so that the platform server obtains a token for the third-party application client according to the application ID and the authorization code and sends the token to the third-party application client;

receiving the token from the platform server; and interacting with the platform server for information related to the user ID via the token.

In various embodiments, an authorization authentication method, applied in a platform server, comprises the following:

receiving an application ID and a user ID from a user client after the user client obtains an authorization instruction; the application ID is obtained by the user client from an authorization request sent by a third-party application client;

sending an authorization code to the user client according to the application ID and the user ID, so that the user client transmits the authorization code to the third-party application client;

receiving the application ID and the authorization code from the third-party application client;

obtaining a token for the third-party application client according to the application ID and the authorization code;

sending the token to the third-party application client; and interacting with the third-party application client for information related to the user ID via the token.

In various embodiments, a third-party application client comprises the following:

a request sending instruction to send an authorization request to a user client, the authorization request carrying an application ID of the third-party application client so that the user client sends the application ID and a user ID to a platform server after obtaining an authorization instruction;

a return receiving instruction to receive an authorization code from the platform server, the authorization code being sent by the platform server to the user client according to the application ID and the user ID, and the user client transmitting the authorization code to the third-party application client;

a token obtaining instruction to send the application ID and the authorization code to the platform server, so that the platform server obtains a token for the third-party application client according to the application ID and the authorization code and sends the token to the third-party application client;

a token receiving instruction to receive the token from the platform server; and an information interacting instruction to interact with the platform server for information related to the user ID via the token.

In various embodiments, a platform server comprises the following:

an identifier receiving instruction to receive an application ID and a user ID from a user client after the user client obtains an authorization instruction; the application ID is obtained by the user client from an authorization request sent by a third-party application client;

a code returning instruction, to send an authorization code to the user client according to the application ID and the user ID, so that the user client transmits the authorization code to the third-party application client;

a code receiving instruction, to receive the application ID and the authorization code from the third-party application client;

a token obtaining instruction, to obtain a token for the third-party application client according to the application ID and the authorization code;

a token sending instruction to send the token to the third-party application client; and an information interacting instruction to interact with the third-party application client for information related to the user ID via the token.

The token is sent to the third-party application client, the third-party application client interacts with the platform server for the information related to the user ID by using the token, thereby solving the problem in the prior art that only the registering operation is omitted and other accumulated resources or information of the user for service provider A cannot be used continuously. The third-party application client may interact with the platform server for the information related to the user ID by using the token, so that other resources or information of the user accumulated for the platform server can be used by the third-party application client continuously.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Accompanying drawings used in various embodiments will be illustrated briefly, so as to clearly describe technical solutions of the various embodiments. The following drawings are merely embodiments of the present disclosure. For those skilled in the art, other drawings may be obtained accordingly without inventive labor.

Corresponding reference numerals indicate corresponding parts throughout the several views of the drawings.

DETAILED DESCRIPTION

Various embodiments will now be described more fully with reference to the accompanying drawings.

Specific examples of the present disclosure will be illustrated in detail hereinafter with reference to the accompanying drawings, so that the above and other characteristics and merits of the present disclosure are clear.

Figure 1:
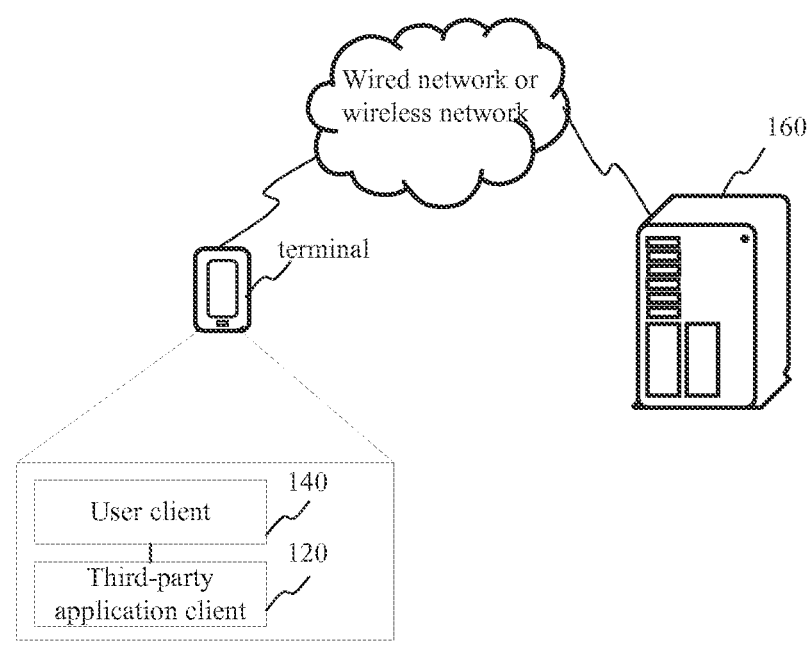
FIG. 1 is a diagram illustrating a structure of an implementation circumstance according to various embodiments of the present disclosure.

FIG. 1 is a diagram illustrating a structure of an implementation according to various embodiments of the present disclosure. The implementation circumstance includes a third-party application client 120, a user client 140, and a platform server 160.

The third-party application client 120 is a first type of client running on a terminal. The first type of client may be a client provided by service provider B, e.g. a forum client, a mail client, a MicroBlog client, an entertainment client, etc.

The user client 140 is a second type of client running on the terminal. The second type of client may be a client provided by service provider A. Usually, service provider B has numbers of users and a buddy relationship chain between the users. The third-party application client 120 and the user client 140 may be running on the same terminal, and the third-party application client 120 may communicate with the user client 140 via a Software Development Kit (SDK) provided by the user client 140.

The platform server 160 is a background server provided by the service provider A, and is to provide services provided by the service provider A for users when combining with the user client 140. The platform server 160 may communicate with the user client 140 and/or the third-party application client 120 via a wired network or wireless network.

The above-mentioned terminal may be a smart phone, a tablet PC, an e-book reader, a Moving Picture Experts Group Audio Layer III (MP3), Moving Picture Experts Group Audio Layer IV (MP4), laptop and desktop computers, etc.

Several terms in the various embodiments are described, by way of non-limiting example, as follows.

An application identifier (ID), called application ID for short, is to identify an identity of the third-party application client 120 on the platform server 160, and may be obtained by the third-party application client 120 via registering procedure on the platform server 160.

A user identifier (user ID) is to identify an identity of the user on the platform server 160, and may be obtained after the user performs a registering procedure via the user client 140 on the platform server 160.

An authorization instruction is an instruction sent to the user client after the user authorizes the third-party application client 120.

An author code is a code sent to the third-party application client 120 for obtaining a token after the platform server 160 determines that the third-party application client 120 has authorized by the user.

An access token, also referred to as a token, is a token sent to the third-party application client 120 for interacting information related to the user ID with the platform server 160, after the platform server 160 determines that the third-party application client 120 has authorized by the user; the token has several interface calling permissions of the platform server 160.

An open identifier, also referred to as an open ID, is an identifier generated according to the application ID and the user ID and is used to replace the user ID in the third-party application client, so as to avoid directly sending the user ID to the third-party application client by the platform server 160. In other words, the identity of the user is identified by the open ID in the third-party application client.

Figure 2:
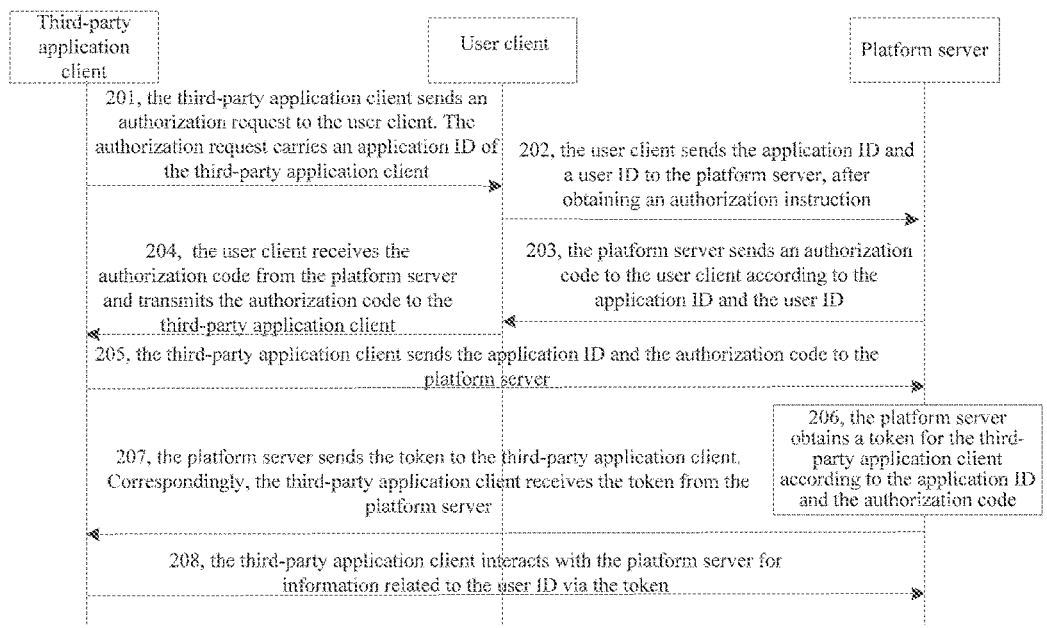
FIG. 2 is a flowchart illustrating an authorization authentication method according to various embodiments of the present disclosure.

FIG. 2 is a flowchart illustrating an authorization authentication method according various embodiments. In the various embodiments, the authorization authentication method is applied in the implementation circumstance shown in FIG. 1, and includes the following processing.

Block 201: the third-party application client sends an authorization request to the user client. The authorization request carries an application ID of the third-party application client. Correspondingly, the user client receives the authorization request from the third-party application client.

Block 202: the user client sends the application ID and a user ID to the platform server, after obtaining an authorization instruction. Correspondingly, the platform server receives the application ID and the user ID from the user client after the user client obtains the authorization instruction.

Block 203: the platform server sends an authorization code to the user client according to the application ID and the user ID.

Block 204: the user client receives the authorization code from the platform server and transmits the authorization code to the third-party application client. Correspondingly, the third-party application client receives the authorization code sent by the platform server.

Block 205: the third-party application client sends the application ID and the authorization code to the platform server. Correspondingly, the platform server receives the application ID and the authorization code from the third-party application client.

Block 206: the platform server obtains a token for the third-party application client according to the application ID and the authorization code.

Block 207: the platform server sends the token to the third-party application client. Correspondingly, the third-party application client receives the token from the platform server.

Block 208: the third-party application client interacts with the platform server for information related to the user ID via the token. The information related to the user ID includes user information, a buddy relationship chain, and information related to the third-party application client. The user information includes at least one of a nickname, an avatar, and a signature.

According to the authorization authentication method provided by the various embodiments, the third-party application client interacts with the platform server for the information related to the user ID by using the token, thereby solving the problem in the prior art that only the registering operations are omitted and other accumulated resources or information of the user for service provider A cannot be used continuously. The third-party application client may interact with the platform server for the information related to the user ID by using the token, so that other resources or information of the user accumulated for the platform server can be used by the third-party application client continuously.

Figure 3A:
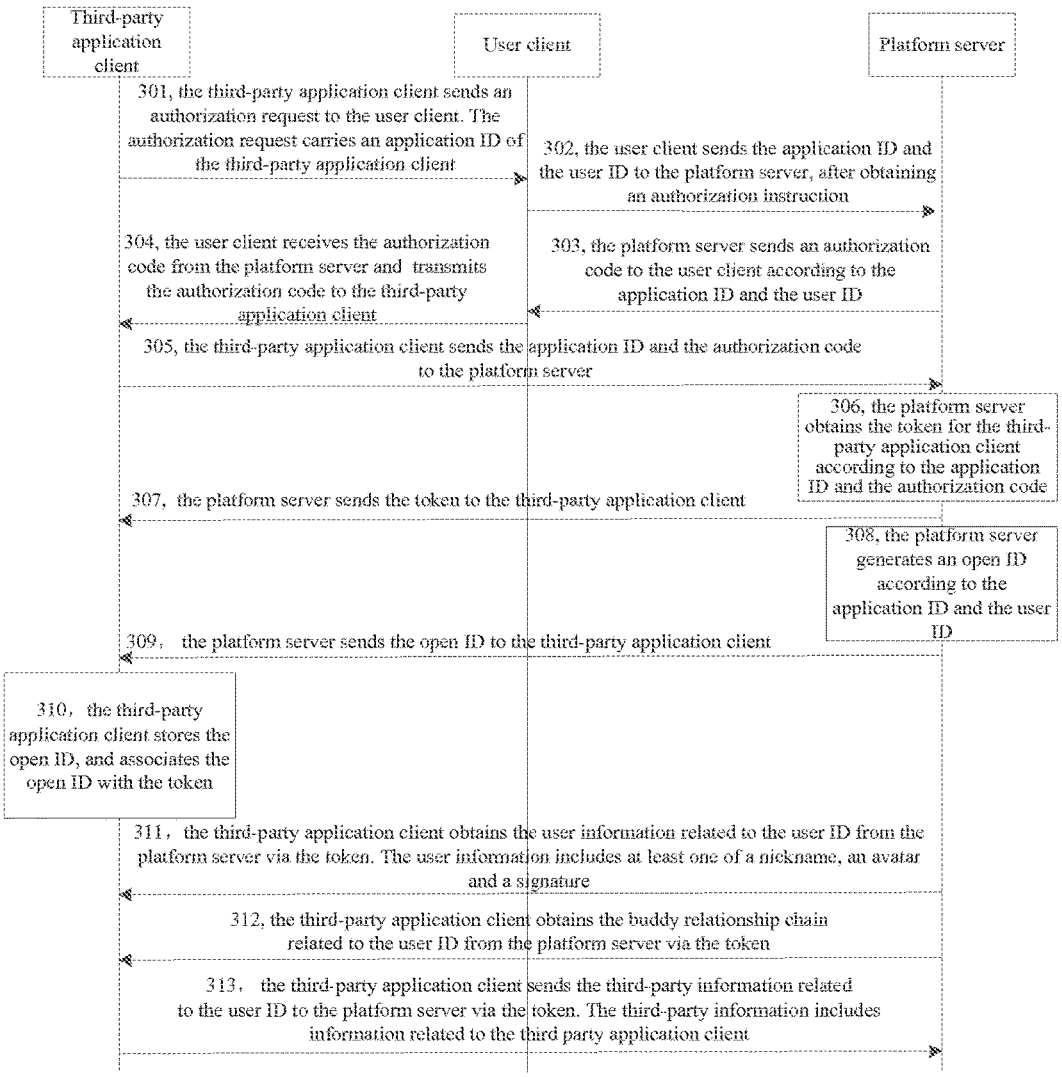
FIG. 3A is a flowchart illustrating an authorization authentication method according to various embodiments of the present disclosure.

FIG. 3A is a flowchart illustrating an authorization authentication method according to various embodiments. In the various embodiments, the authorization authentication method is also applied in the implementation circumstance shown in FIG. 1. In this example which is a preferable example based on the various embodiments, the user client is a "Xchat" client provided by the service provider A providing IM services, the third-party application client is a "recite words" client provided by the service provider B providing words reciting services, the "Xchat" client and "recite words" client are running at the same terminal, and the service provider A has numbers of user and a buddy relationship chain corresponding to each user. The authorization authentication method includes the following processes.

Block 301: the third-party application client sends an authorization request to the user client. The authorization request carries an application ID of the third-party application client. The third-party application client sends the authorization request to the user client via a SDK provided by the user client in advance, when the third-party application client needs to obtain the authorization. The authorization request carries the application ID of the third-party application client.

Figure 3B:
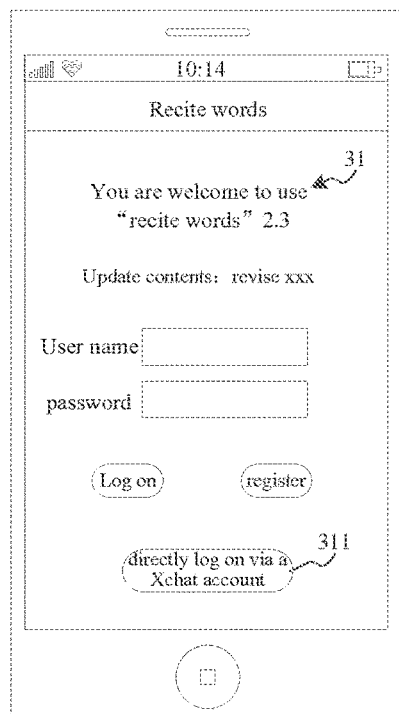
FIG. 3B is a diagram illustrating a first implementation according to various embodiments of the present disclosure.
Figure 3C:
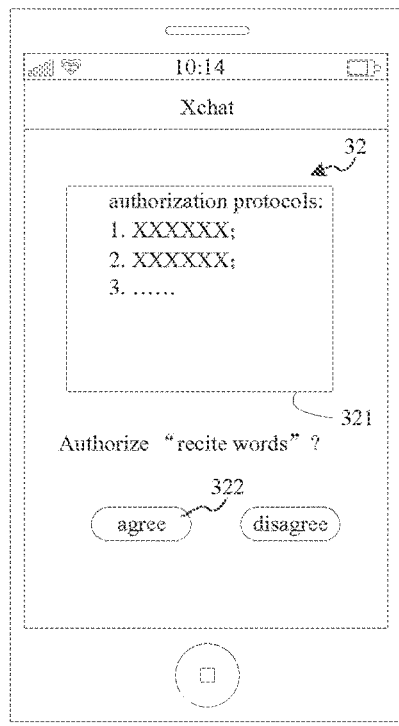
FIG. 3C is a diagram illustrating a second implementation according to various embodiments of the present disclosure.

For example, in reference to FIG. 3B, when the third-party application client "recite words" is running on the terminal of the user, if the user does not want to register for the third-party application client "recite words" but wants to directly logs on and use the third-party application client "recite words" by using the user ID registered for the user client "Xchat", the user clicks a button 311 of "directly log on via a Xchat account" on an interface 31 of the third-party application client "recite words" to trigger the third-party application client "recite words" to send the authorization request to the user client "Xchat". The authorization request carries the application ID of the third-party application client "recite words".

Correspondingly, the user client receives the authorization request from the third-party application client. That is, the user client receives the authorization request from the third-party application client via the SDK provided for the third-party application client in advance.

Block 302: the user client sends the application ID and the user ID to the platform server, after obtaining an authorization instruction. The user client sends the application ID and the user ID to the platform server, after obtaining the authorization instruction. For example, in reference to FIG.

3C, after the user clicks the button 311, the interface 31 of the terminal switches to an interface 32 of the user client "Xchat". The interface 32 shows contents of the authorization 321 requested by the third-party application client "recite words". If the user agrees with the authorization, the user clicks a button 322 of "agree" to send the authorization instruction to the user client "Xchat". The user client "Xchat" sends the application ID and the user ID to the platform server after obtaining the authorization instruction. Correspondingly, the platform server receives the application ID and the user ID from the user client after the user client obtains the authorization instruction.

Block 303: the platform server sends an authorization code to the user client according to the application ID and the user ID. After receiving the application ID and the user ID sent by the user client, the platform server determines that the user has authorized the third-party application client, and sends the authorization code to the user client according to the application ID and the user ID.

Block 304: the user client receives the authorization code from the platform server and transmits the authorization code to the third-party application client. The user client receives the authorization code from the platform server and transmits the authorization code to the third-party application client via the SDK provided in advance. The procedure is imperceptible of the user. Correspondingly, the third-party application client receives the authorization code sent by the platform server.

Block 305: the third-party application client sends the application ID and the authorization code to the platform server. After obtaining the authorization code, the third-party application client needs to obtain the corresponding token by using the authorization code. The third-party application client sends the application ID and the authorization code to the platform server. Correspondingly, the platform server receives the application ID and the authorization code from the third-party application client. The platform server does not directly send the token to the third-party application client in block 303, but sends the authorization code first, so as to ensure the security. The token is sent to the third-party application client when the platform server directly communicates with the third-party application.

Block 306: the platform server obtains the token for the third-party application client according to the application ID and the authorization code. The platform server obtains the token for the third-party application client according to the application ID and the authorization code. The token has a permission to call at least one interface of the platform server. The interface includes at least one of a user information interface, a buddy relationship chain interface, and an information sending interface.

Block 307: the platform server sends the token to the third-party application client. Correspondingly, the third-party application client receives the token from the platform server.

Figures 3D, 3E:
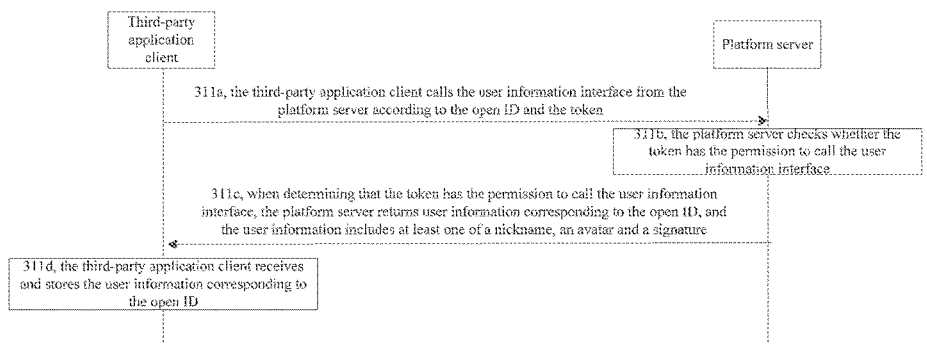
FIG. 3D is a diagram illustrating a storage relation of information stored in a platform server.
FIG. 3E is a flowchart illustrating a part of sub-steps according to various embodiments of the present disclosure.

Block 308: the platform server generates an open ID according to the application ID and the user ID. The platform server generates an open ID according to the application ID and the user ID. The open ID replaces the user ID in the third-party application client. Specifically, the platform server may combine the application ID and the user ID and encrypts the combination to generate the open ID. The platform server may store a relationship of the application IDs, user IDs, open IDs, tokens, and interface call permission corresponding to the tokens, as shown in FIG. 3D.

Block 309: the platform server sends the open ID to the third-party application client. The platform server sends the open ID to the third-party application client. Correspondingly, the third-party application client receives the open ID from the platform server. The open ID is generated by the platform server according to the application ID and the user ID, and is to replace the user ID in the third-party application client. The platform server will not reveal the user ID to the third-party application client, and the third-party application client only can obtain the open ID and identify the identity of the user by using the open ID.

Blocks 309 and 307 may be performed at the same time, that is, the platform server sends both the token and the open ID to the third-party application client. In the various embodiments, the blocks 309 and 307 are described separately, which is not limited in the present disclosure.

Block 310: the third-party application client stores the open ID, and associates the open ID with the token. The third-party application client interacts with the platform server for information related to the user ID via the token. That is, the platform server interacts with the third-party application client for information related to the user ID via the token. The information related to the user ID includes user information, a buddy relationship chain, and information related to the third-party application client. The user information includes at least one of a nickname, an avatar, and a signature.

Bock 311: the third-party application client obtains the user information related to the user ID from the platform server via the token. The user information includes at least one of a nickname, an avatar, and a signature.

The third-party application client obtains the user information related to the user ID from the platform server via the token. The user information includes at least one of a nickname, an avatar, and a signature. In other words, the platform server provides the user information related to the user ID for the third-party application client via the token.

In reference to FIG. 3E, block 311 may include the following sub-blocks. 311a: the third-party application client calls the user information interface from the platform server according to the open ID and the token. For example, the third-party application client sends a first request to the user information interface, and the first request is to obtain the user information corresponding to the user ID. Because the open ID replaces the user ID in the third-party application client, the first request includes the token and the open ID. Correspondingly, the platform server receives the request for calling the user information interface from the third-party application client according to the open ID and the token. For example, the platform server receives the first request sent by the third-party application client to the user information interface, and the first request includes the token and the open ID.

311b: the platform server checks whether the token has the permission to call the user information interface.

311c: when determining that the token has the permission to call the user information interface, the platform server returns user information corresponding to the open ID, and the user information includes at least one of a nickname, an avatar, and a signature.

311d: the third-party application client receives and stores the user information corresponding to the open ID.

Afterwards, the third-party application client may use the user information accumulated by the user on the platform server. For example, the third-party application client "recite words" may directly use the nickname, avatar, and signature accumulated by the user on the platform server, so that the nickname, avatar, and signature of the user on the third-party application client "recite words" and the user client "Xchat" are the same.

Block 312: the third-party application client obtains the buddy relationship chain related to the user ID from the platform server via the token. In other words, the platform server provides the buddy relationship chain related to the user ID for the third-party application client via the token.

Figure 3F:
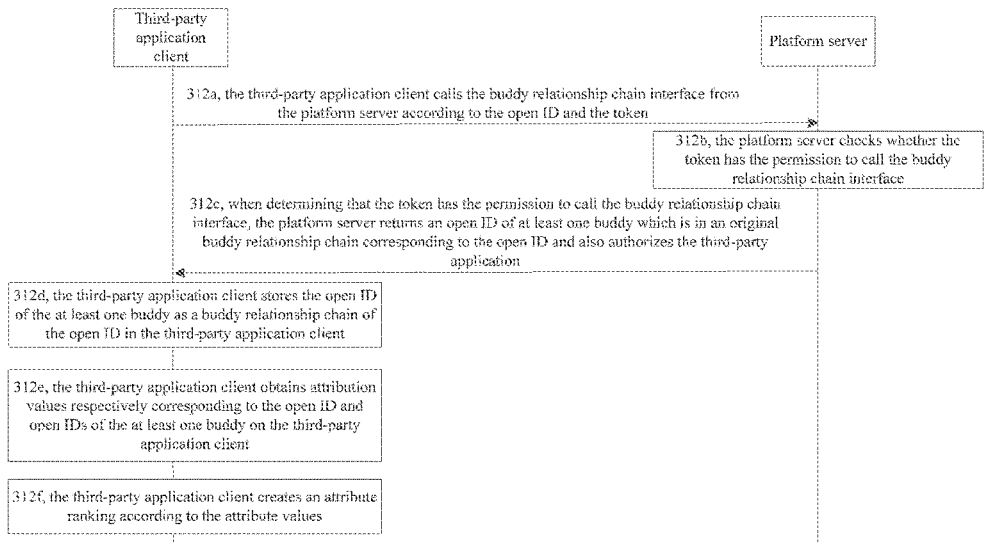
FIG. 3F is a flowchart illustrating another part of sub-steps according to various embodiments of the present disclosure.

In reference to FIG. 3F, block 312 may include the following sub-blocks.

312a: the third-party application client calls the buddy relationship chain interface from the platform server according to the open ID and the token. For example, the third-party application client sends a second request to the buddy relationship chain interface and the second request is to obtain the buddy relationship chain corresponding to the user ID. Because the open ID replaces the user ID in the third-party application client, the second request includes the token and the open ID. Correspondingly, the platform server receives the request for calling the buddy relationship chain interface from the third-party application client according to the open ID and the token. For example, the platform server receives the second request sent by the third-party application client to the buddy relationship chain interface, and the second request includes the token and the open ID.

312b: the platform server checks whether the token has the permission to call the buddy relationship chain interface.

312c: when determining that the token has the permission to call the buddy relationship chain interface, the platform server returns an open ID of at least one buddy which is in an original buddy relationship chain corresponding to the open ID and also authorizes the third-party application. For example, user A has 10 buddies in the original buddy relationship chain on the platform server, i.e. buddies A1 to A10. Buddies A1, A3, and A7 also authorize the third-party application while other buddies do not authorize the third-party application. In the example, the platform server does not directly send the original buddy relationship chain including the 10 buddies to the third-party application client, but sends a buddy relationship chain including the buddies A1, A3, and A7 to the third-party application client. In the buddy relationship chain, buddies A1, A3, and A7 are identified by using the open IDs corresponding to buddies A1, A3, and A7.

312d: the third-party application client stores the open ID of the at least one buddy as a buddy relationship chain of the open ID in the third-party application client. Afterwards, the third-party application client may use the buddy relationship chain accumulated by the user on the platform server, which includes the following processes.

312e: the third-party application client obtains attribution values respectively corresponding to the open ID and open IDs of the at least one buddy on the third-party application client. The attribution value may be a level, scores or contribution values accumulated by the user on the third-party application client. For example, the attribution value of the user on the third-party application client "recite words" may be the number of words recited by the user. For the user A, the third-party application client may obtain the number of words recited by user A, buddy A1, buddy A3, and buddy A7 at the same time.

Figure 3G:
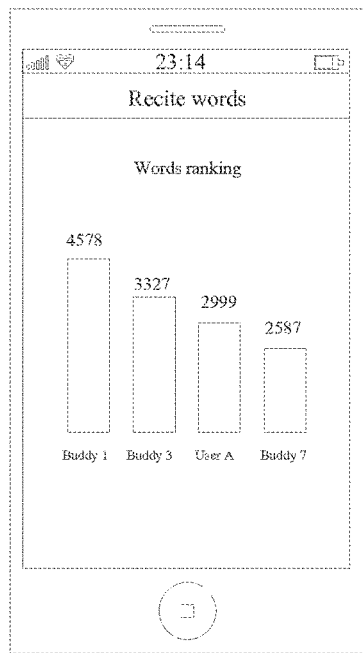
FIG. 3G is a diagram illustrating a third implementation according to various embodiments of the present disclosure.

312f: the third-party application client creates an attribute ranking according to the attribute values. For example, the third-party application client "recite words" obtains the number of words recited by user A, buddy A1, buddy A3, and buddy A7 on the third-party application client, and creates an attribute ranking for the four users, as shown in FIG. 3G.

Block 313: the third-party application client sends the third-party information related to the user ID to the platform server via the token. The third-party information includes information related to the third party application client. The third-party application client sends the third-party information related to the user ID to the platform server via the token. The third-party information includes information related to the third party application client. Correspondingly, the platform server receives and processes the third-party information related to the user ID from the third-party application client via the token.

Figure 3H:
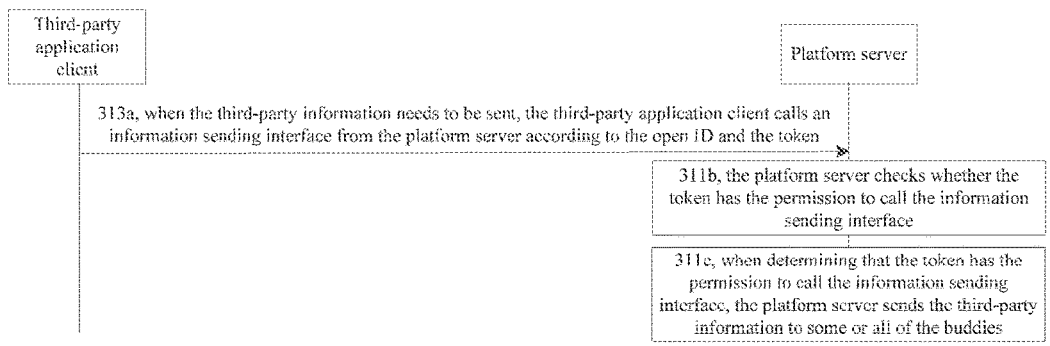
FIG. 3H is a flowchart illustrating another part of sub-steps according to various embodiments of the present disclosure.

In reference to FIG. 3H, block 313 may include the following sub-blocks.

313a: when the third-party information needs to be sent, the third-party application client calls an information sending interface from the platform server according to the open ID and the token. When the third-party information needs to be sent, the third-party application client sends a third request to the buddy relationship chain interface, and the third request is to send the third-party information to at least one buddy corresponding to the user ID. Because the open ID replaces the user ID in the third-party application client, the third request includes the token and the open ID and an open ID of a target buddy. The at least one buddy is included in the original buddy relationship chain corresponding to the open ID and authorizes the third-party application. Correspondingly, the platform server receives the request for calling the buddy relationship chain interface from the third-party application client according to the open ID and the token. For example, the platform server receives the third request sent by the third-party application client to the information sending interface, and the third request includes the token, the open ID, and the open ID of a target buddy.

For example, when the number of words recited by the user A reaches 10000, the third-party application client generates third-party information "the number of words recited by the user A reaches 10000", and sends the third request to the platform server. The third request includes the token, the open ID of the user A, the open IDs of target buddies A1, A3, and A7, and the third-party information "the number of words recited by the user A reaches 10000".

311b: the platform server checks whether the token has the permission to call the information sending interface.

311c: when determining that the token has the permission to call the information sending interface, the platform server sends the third-party information to some or all of the buddies. For example, when determining that the token has the permission to call the information sending interface, the platform server sends the third-party information "the number of words recited by the user A reaches 10000" which is sent by the user via the third-party application client "recite words" to the buddies A1, A3, and A7.

According to the authorization authentication method provided by the various embodiments, the third-party application client interacts with the platform server for the information related to the user ID by using the token, thereby addressing that only the registering operation is omitted and other accumulated resources or information of the user for service provider A cannot be used continuously. The third-party application client may interact with the platform server for the information related to the user ID by using the token, so that other resources or information of the user accumulated for the platform server can be used by the third-party application client continuously.

In addition, the third-party application client obtains the user information and/or the buddy relationship chain from the platform server via the token and sends the third-party information to the platform server via the token so that the resources and information accumulated by the user for the third-party application client and the platform server, respectively, are shared in the authorization scope.

Figure 4A:
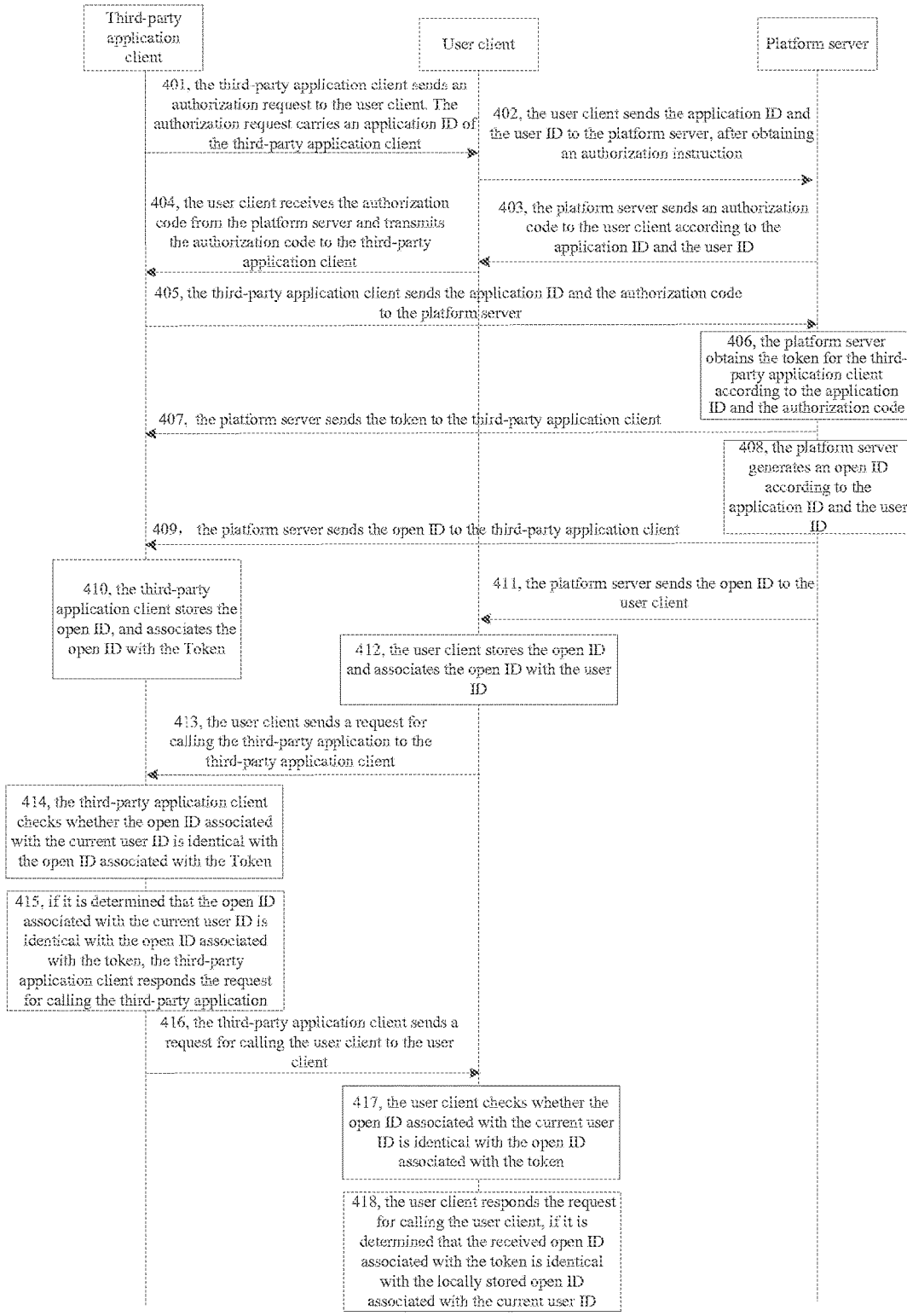
FIG. 4A is a flowchart illustrating an authorization authentication method according to various embodiments of the present disclosure.

FIG. 4A is a flowchart illustrating an authorization authentication method according to various embodiments. In the various embodiments, the authorization authentication method is also applied in the implementation circumstance shown in FIG. 1. In this example, the third-party application client and the user client call each other. The authorization authentication method includes the following processes. Blocks 401 to 410 are the same or similar, and are not described herein.

Block 411: the platform server sends the open ID to the user client. The platform server sends open ID to the user client. Correspondingly, the user client receives the open ID from the platform server. The open ID is generated by the platform server according to the application ID and the user ID, and is used to replace the user ID on the third-party application client.

Block 412: the user client stores the open ID and associates the open ID with the user ID. The user client stores the open ID and associates the open ID with the user ID. Afterwards, the user client and the third-party application client call each other according to the open ID. The third-party application client and the user client call each other according to the open ID. The calling procedure may be implemented based on the SDK provided in advance, and includes the following processes.

Figure 4B:
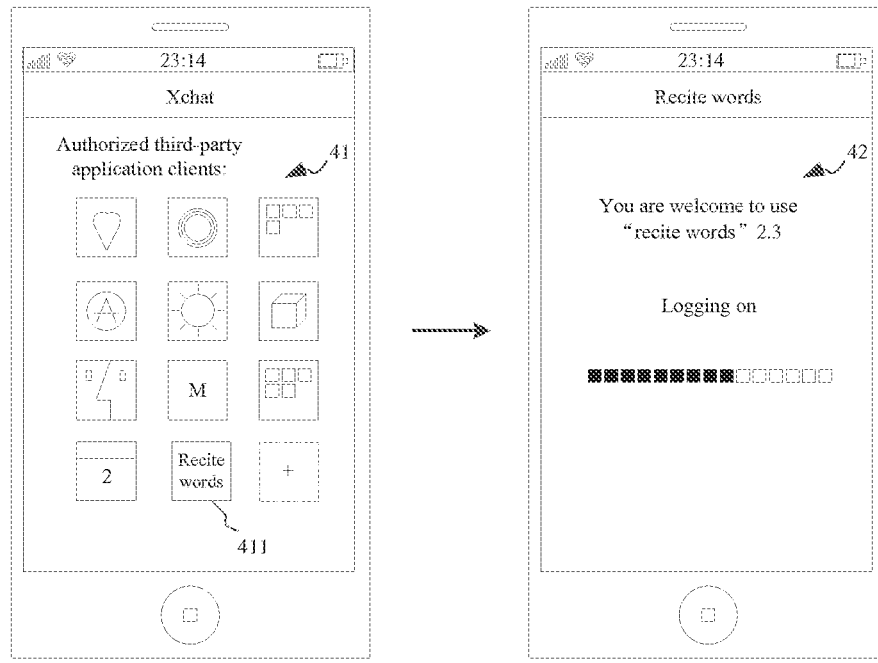
FIG. 4B is a diagram illustrating a first implementation according to various embodiments of the present disclosure.

Block 413: the user client sends a request for calling the third-party application to the third-party application client. The request for calling the third-party application may be used to start the third-party application client. For example, in reference to an interface 41 shown in FIG. 4B, the user is using the user client "Xchat" on the terminal and wants to start the third-party application client "recite words", the user clicks a button 411 of "recite words" on the interface 41 to trigger the user client "Xchat" to send the request for calling the third-party application to the third-party application client. The request for calling the third-party application carries the open ID associated with a current user ID. The current user ID is an identifier of a user currently logging on as the user client. Usually, the current user ID of the terminal is unchanged. If another user logs on to the user terminal, the current user ID may be changed. Correspondingly, the third-party application client receives the request for calling the third-party application from the user client.

Block 414: the third-party application client checks whether the open ID associated with the current user ID is identical with the open ID associated with the token. For the purpose of checking whether the current user has changed, the third-party application client checks whether the received open ID associated with the current user ID is identical with the locally stored open ID associated with the token. If yes, the current user is not changed, otherwise, the current user has changed.

Block 415: if it is determined that the open ID associated with the current user ID is identical with the open ID associated with the token, the third-party application client responds the request for calling the third-party application. If it is determined that the open ID associated with the current user ID is identical with the open ID associated with the token, the third-party application client starts and runs by using the open ID to identify the user logging on currently.

Figure 4C:
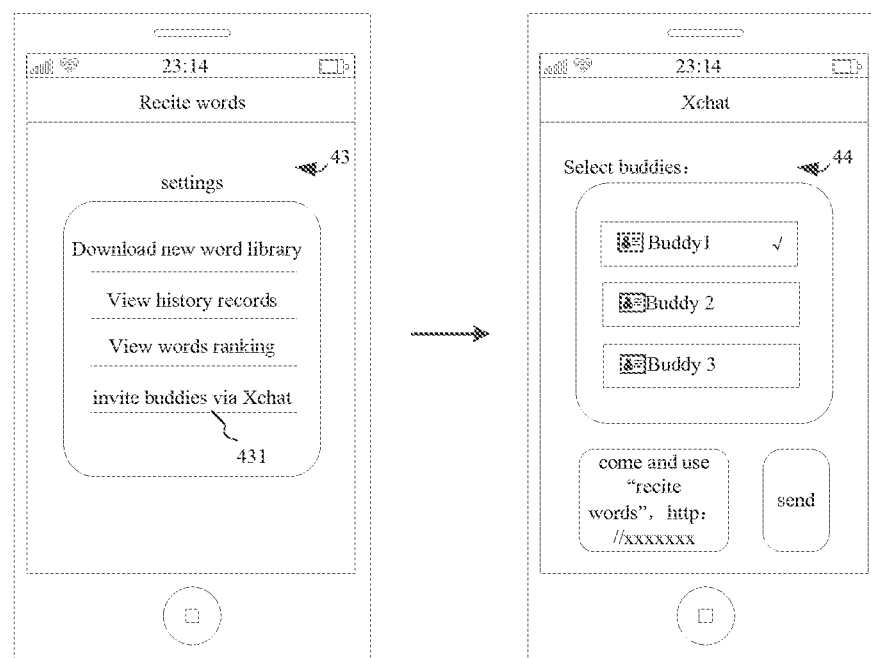
FIG. 4C is a diagram illustrating a second implementation according to various embodiments of the present disclosure.

Block 416: the third-party application client sends a request for calling the user client to the user client. In one case, the request for calling the user client may be used to invite buddies to use the third-party application client. For example, in reference to an interface 43 shown in FIG. 4C, the user is using the third-party application client "recite words" on the terminal and wants to invite buddies to use the third-party application client "recite words", the user clicks a function bar 431 of "invite buddies via Xchat" on the interface 43 to trigger the third-party application client "recite words" to send the request for calling the user client to the user client "Xchat". The request for calling the user client carries the open ID associated with the token.

Figure 4D:
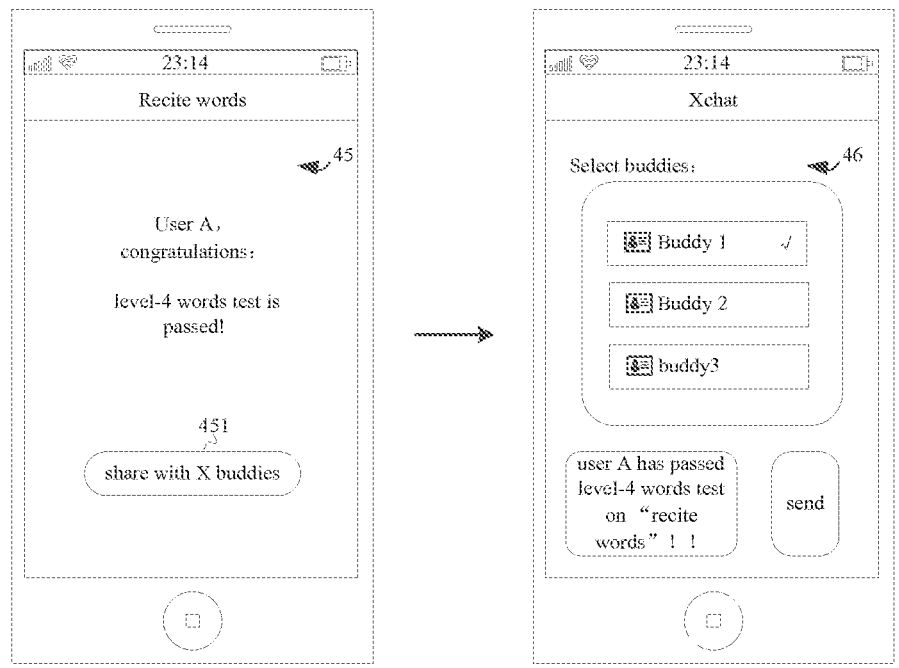
FIG. 4D is a diagram illustrating a second implementation according to various embodiments of the present disclosure.

In another case, the request for calling the user client may be used to share content information in the third-party application client. For example, referring to an interface 45 shown in FIG. 4D, the user is using the third-party application client "recite words" on the terminal and wants to share the content information of "pass level-4 words test" with buddies, the user clicks a function bar 451 of "share with X buddies" on the interface 45 to trigger the third-party application client "recite words" to send the request for calling the user client to the user client "Xchat". The request for calling the user client carries the open ID associated with the token.

Block 417: the user client checks whether the open ID associated with the current user ID is identical with the open ID associated with the token. For the purpose of checking whether the current user has changed, the user client checks whether the received open ID associated with the token is identical with the locally stored open ID associated with the current user ID. If yes, the current user is not changed, otherwise, the current user has changed.

Block 418: the user client responds to the request for calling the user client if it is determined that the received open ID associated with the token is identical with the locally stored open ID associated with the current user ID. If the request for calling the user client is used to invite buddies to use the third-party application client, the user client sends the inviting information for using the third-party application client to at least one buddy in an original buddy relationship chain corresponding to the user ID via the platform server. For example, in reference to an interface 44 shown in FIG. 4C, the user selects three buddies on the interface 44, clicks a button 441 of "send" on the interface 44 to trigger the user client to send the inviting information of "come and use "recite words"" to three buddies in the original buddy relationship chain corresponding to the user ID via the platform server.

If the request for calling the user client is used to share content information in the third-party application client, the user client shares the content information of the third-party application client to a show page corresponding to the user ID or at least one buddy in the original buddy relationship chain via the platform server. For example, referring to an interface 46 shown in FIG. 4D, the user selects one buddy on the interface 45, clicks a button 441 of "send" on the interface 45 to trigger the user client to share the content information of "pass level-4 words test" to the buddy in the original buddy relationship chain corresponding to the user ID via the platform server.

According to the authorization authentication method provided by the various embodiments, the third-party application client interacts with the platform server for the information related to the user ID by using the token, thereby addressing that only the registering operation is omitted and other accumulated resources or information of the user for service provider A cannot be used continuously. The third-party application client may interact with the platform server for the information related to the user ID by using the token, so that other resources or information of the user accumulated for the platform server can be used by the third-party application client continuously.

In addition, the third-party application client and the user client call each other by using the open ID, so that information is shared between the third-party application client and the user client.

It should be noted that the blocks 311 to 313 in the various embodiments may be combined with the blocks 411 to 418 in the various embodiments.

The apparatus provided by various embodiments of the present disclosure will be described hereinafter. Details not described in the apparatus examples may refer to the above-mentioned method examples.

Figure 5:
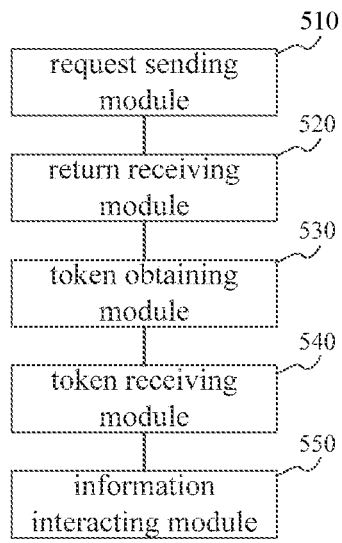
FIG. 5 is a diagram illustrating a structure of a third-party application client according to various embodiments of the present disclosure.

FIG. 5 is a diagram illustrating a structure of a third-party application client according to various embodiments. The third-party application client includes a request sending module 510, a return receiving module 520, a token obtaining module 530, a token receiving module 540, and an information interacting module 550. The request sending module 510 sends an authorization request to a user client. The authorization request carries an application ID of the third-party application client, so that the user client may send the application ID and a user ID to a platform server after obtaining an authorization instruction. The return receiving module 520 is to receive an authorization code from the platform server, the authorization code is sent by the platform server to the user client according to the application ID and the user ID, and the user client transmits the authorization code to the third-party application client. The token obtaining module 530 is to send the application ID and the authorization code to the platform server so that the platform server may obtain a token for the third-party application client according to the application ID and the authorization code and send the token to the third-party application client. The token receiving module 540 is to receive the token from the platform server. The information interacting module 550 is to interact with the platform server for information related to the user ID via the token.

In various embodiments, the third-party application client also includes a first receiving module, to receive an open ID from the platform server; the open ID being generated by the platform server according to the application ID and the user ID and being used to replace the user ID in the third-party application client;

a first storing module, to store the open ID and associate the open ID with the token; and a user calling module, to call the user client by using the open ID or be called by the user client by using the open ID.

In various embodiments, the information interacting module 550 includes at least one of a user information obtaining unit, a buddy relationship obtaining unit, and a third-party information sending unit. The user information obtaining unit obtains the user information related to the user ID from the platform server via the token, and the user information includes at least one of a nickname, an avatar, and a signature.

The buddy relationship obtaining unit obtains the buddy relationship chain related to the user ID from the platform server via the token.

Third-party information sending unit sends third-party information related to the user ID to the platform server via the token, and the third-party information includes information related to the third-party application client.

In various embodiments, the user information obtaining unit includes a first interface calling subunit and a user information storing unit. The first interface calling subunit calls a user information interface from the platform server according to the open ID and the token so that the platform server returns user information corresponding to the open ID when determining that the token has the permission to call the user information interface. The user information storing unit receives and stores the user information corresponding to the open ID.

In various embodiments, the buddy relationship obtaining unit includes a second interface calling subunit and a buddy relationship storing subunit. The second interface calling subunit calls the buddy relationship chain interface from the platform server according to the open ID and the token so that, when determining that the token has the permission to call the buddy relationship chain interface, the platform server returns an open ID of at least one buddy which is in the original buddy relationship chain corresponding to the open ID and also authorizes the third-party application. The buddy relationship storing subunit stores the open ID of the at least one buddy as a buddy relationship chain of the open ID in the third-party application client.

In various embodiments, the third-party application client also includes an attribution obtaining unit and an attribution arranging unit. The attribution obtaining unit obtains attribution values respectively corresponding to the open ID and open IDs of the at least one buddy on the third-party application client. The attribution arranging unit creates an attribute ranking according to the attribute values.

In various embodiments, the third-party information sending unit calls an information sending interface from the platform server according to the open ID and the token when the third-party information needs to be sent so that the platform server sends the third-party information to some or all of the buddies when determining that the token has the permission to call the information sending interface. The at least one buddy is included in an original buddy relationship chain corresponding to the open ID and authorizes the third-party application.

In various embodiments, the user calling module includes a first calling request unit. The first calling request unit sends a request for calling the user client to the user client. The request for calling the user client carries the open ID associated with the token, so that the user client checks whether an open ID associated with a current user ID is identical with the open ID associated with the token, and responds to the request for calling the user client if it is determined that the open ID associated with the current user ID is identical with the open ID associated with the token. The current user ID is an identifier of a user currently logging on the user client.

In various embodiments, the request for calling the user client sent by the first calling request unit invites buddies to use the third-party application client or to share content information of the third-party application client.

In various embodiments, the user calling module includes a first request receiving unit, a first identifier checking unit, and a first request responding unit. The first request receiving unit receives a request for calling the third-party application from the user client. The request for calling the third-party application carries an open ID associated with a current user ID. The first identifier checking unit checks whether the open ID associated with the current user ID is identical with the open ID associated with the token. The first request responding unit responds to the request for calling the third-party application if the identifier checking unit determines that the open ID associated with the current user ID is identical to the open ID associated with the token. The current user ID is an identifier of a user currently logging on the user client.

In various embodiments, when the request for calling the third-party application received by the first request receiving unit starts the third-party application client, the first request responding unit starts and runs by using the open ID to identify the user logging on currently.

As can be seen, according to the authorization authentication method provided by the various embodiments, the third-party application client interacts with the platform server for the information related to the user ID by using the token. This addresses that only the registering operation is omitted and other accumulated resources or information of the user for service provider A cannot be used continuously. The third-party application client may interact with the platform server for the information related to the user ID by using the token so that other resources or information of the user accumulated for the platform server can be used by the third-party application client continuously. The third-party application client obtains the user information and/or the buddy relationship chain from the platform server via the token and sends the third-party information to the platform server via the token, so that the resources and information accumulated by the user for the third-party application client and the platform server, respectively, are shared in the authorization scope. In addition, the third-party application client and the user client call each other by using the open ID, so that information is shared between the third-party application client and the user client.

Figure 6:
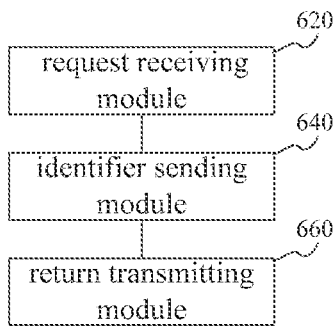
FIG. 6 is a diagram illustrating a structure of a user client according to various embodiments of the present disclosure.

FIG. 6 is a diagram illustrating a structure of a user client according to various embodiments. The user client includes a request receiving module 620, an identifier sending module 640, and a return transmitting module 660. The request receiving module 620 receives an authorization request from a third-party application client. The authorization request carries an application ID of the third-party application client. The identifier sending module 640 sends the application ID and a user ID to a platform server after obtaining an authorization instruction, so that the platform server sends an authorization code according to the application ID and the user ID. The return transmitting module 660 receives an authorization code from the platform server and transmits the authorization code to the third-party application client, so that the third-party application client obtains a token from the platform server according to the application ID and the authorization code and interacts with the platform server for information related to the user ID via the token.

In various embodiments, the user client also includes:

a second receiving module, to receive an open ID from the platform server; the open ID being generated by the platform server according to the application ID and the user ID and being used to replace the user ID in the third-party application client;

a second storing module, to store the open ID and associate the open ID with the user ID;

a third-party calling module to call the third-party application client by using the open ID or be called by the third-party application client by using the open ID.

In various embodiments, the third-party calling module includes a second request receiving unit, a second identifier checking unit, and a second request responding unit. The second request receiving unit receives a request for calling the user client from the third-party application client. The request for calling the user client carries the open ID associated with the token. The second identifier checking unit checks whether an open ID associated with a current user ID is identical with the open ID associated with the token. The second request responding unit responds to the request for calling the user client if the second identifier checking unit determines that the open ID associated with the current user ID is identical with the open ID associated with the token. The current user ID is an identifier of a user currently logging on the user client.

In various embodiments, the second request responding unit sends inviting information for using the third-party application client to at least one buddy in an original buddy relationship chain corresponding to the user ID via the platform server if the request for calling the user client is used to invite buddies to use the third-party application client;

shares content information of the third-party application client with a show page corresponding to the user ID or with at least one buddy in an original buddy relationship chain via the platform server, if the request for calling the user client is used to share the content information in the third-party application client.

In various embodiments, the third-party calling module includes a second calling request unit. The second calling request unit sends a request for calling the third-party application to the third-party application client. The request for calling the third-party application carries an open ID associated with a current user ID so that the third-party application client checks whether the open ID associated with the current user ID is identical with the open ID associated with the token and responds the request for calling the third-party application if it is determined that the open ID associated with the current user ID is identical with the open ID associated with the token. The current user ID is an identifier of a user currently logging on the user client.

In various embodiments, the request for calling the third-party application sent by the second calling request unit starts the third-party application client. According to the authorization authentication method provided by the various embodiments, the third-party application client interacts with the platform server for the information related to the user ID by using the token. The third-party application client may interact with the platform server for the information related to the user ID by using the token so that other resources or information of the user accumulated for the platform server can be used by the third-party application client continuously. The third-party application client and the user client call each other by using the open ID, so that information is shared between the third-party application client and the user client.

Figure 7:
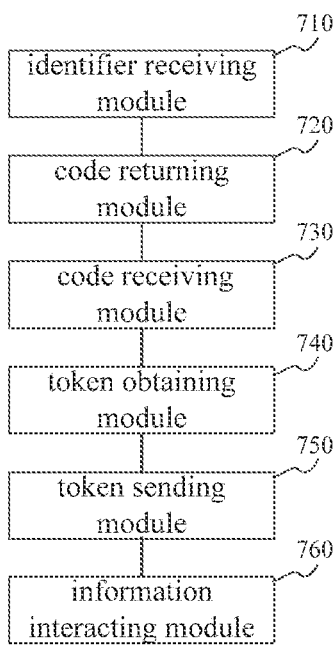
FIG. 7 is a diagram illustrating a structure of a platform server according to various embodiments of the present disclosure.

FIG. 7 is a diagram illustrating a structure of a platform server according to various embodiments. The platform server includes an identifier receiving module 710, a code returning module 720, a code receiving module 730, a token obtaining module 740, a token sending module 750, and an information interacting module 760. The identifier receiving module 710 receives an application ID and a user ID from a user client after the user client obtains an authorization instruction. The application ID is obtained by the user client from an authorization request sent by the third-party application client. The code returning module 720 sends an authorization code to the user client according to the application ID and the user ID so that the user client transmits the authorization code to the third-party application client. The code receiving module 730 receives the application ID and the authorization code from the third-party application client. The token obtaining module 740 obtains a token for the third-party application client according to the application ID and the authorization code. The token sending module 750 sends the token to the third-party application client. The information interacting module 760 interacts with the third-party application client for information related to the user ID via the token.

In various embodiments, the platform server also includes an identifier generating module and a first sending module and/or an identifier generating module and a second sending module. The identifier generating module generates an open ID according to the application ID and the user ID, the open ID is used to replace the user ID in the third-party application client. The first sending module sends the open ID to the third-party application client, so that the third-party application client receives and stores the open ID and associates the open ID with the token. The second sending module sends the open ID to the user client so that the user client receives and stores the open ID and associates the open ID with the user ID.

In various embodiments, the information interacting module 760 includes at least one of a user information providing unit, a buddy relationship obtaining unit, and a third-party information sending unit. The user information providing unit provides the user information related to the user ID to the third-party application client via the token. The user information includes at least one of a nickname, an avatar, and a signature. The buddy relationship obtaining unit provides the buddy relationship chain related to the user ID to the third-party application client via the token. The third-party information sending unit receives and processes the third-party information related to the user ID sent by the third-party application client via the token. The third-party information includes information related to the third party application client.

In various embodiments, the user information providing unit includes a first calling subunit, a first permission checking subunit, and a user information providing subunit. The first calling subunit receives a request for calling a user information interface sent by the third-party application client according to the open ID and the token. The first permission checking subunit checks whether the token has the permission to call the user information interface. The user information providing subunit returns user information corresponding to the open ID when it is determined that the token has the permission to call the user information interface. The user information includes at least one of an avatar, a nickname, and a signature so that the third-party application client receives and stores the user information corresponding to the open ID.

In various embodiments, the buddy relationship providing unit includes a second calling subunit, a second permission checking subunit, and a buddy relationship providing subunit. The second calling subunit receives a request for calling a buddy relationship chain interface sent by the third-party application client according to the open ID and the token. The second permission checking subunit checks whether the token has the permission to call the buddy relationship chain interface. The buddy relationship providing subunit, when determining that the token has the permission to call the buddy relationship chain interface, returns an open ID of at least one buddy authorizing the third-party application in an original buddy relationship chain corresponding to the open ID when determining that the token has the permission to call the buddy relationship chain interface so that the third-party application client stores the open ID of the at least one buddy as a buddy relationship chain of the open ID in the third-party application client.

In various embodiments, the third-party information processing unit includes a third calling subunit, a third permission checking subunit, and a third-party information sending subunit. The third calling subunit receives a request for calling an information sending interface sent by the third-party application client according to the open ID and the token when the third-party information needs to be sent. The third permission checking subunit checks whether the token has the permission to call the information sending interface. The third-party information sending subunit, when it is determined that the token has the permission to call the information sending interface, sends the third-party information to some or all of the buddies. The at least one buddy is included in the original buddy relationship chain corresponding to the open ID and authorizes the third-party application.

According to the authorization authentication method provided by the various embodiments, the third-party application client interacts with the platform server for the information related to the user ID by using the token. The third-party application client may interact with the platform server for the information related to the user ID by using the token so that other resources or information of the user accumulated for the platform server can be used by the third-party application client continuously. In addition, the third-party application client obtains the user information and/or the buddy relationship chain from the platform server via the token and sends the third-party information to the platform server via the token so that the resources and information accumulated by the user for the third-party application client and the platform server, respectively, are shared in the authorization scope.

In addition, the third-party application client and the user client call each other by using the open ID so that information is shared between the third-party application client and the user client.

Figure 8:
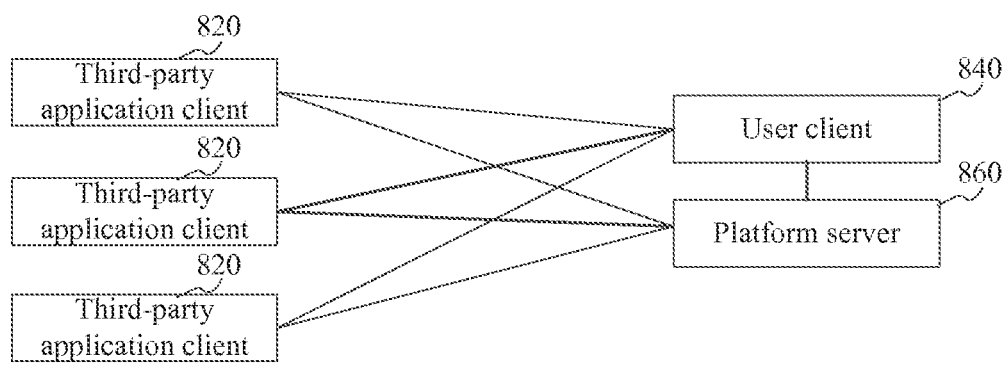
FIG. 8 is a flowchart illustrating an authorization authentication system according to various embodiments of the present disclosure.

FIG. 8 is a flowchart illustrating an authorization authentication system according to various embodiments. The system includes at least one third-party application client 820, a user client 840, and a platform server 860. The at least one third-party application client 820 and the user client 840 may be both running on the same terminal. The third-party application client may be the third-party application client described in the fourth example or in various embodiments based on the fourth example. The user client may be the user client described in the fifth example or in various embodiments based on the fifth example. The platform server may be the platform server described in the fifth example or in preferable various embodiments based on the fifth example.

According to the authorization authentication method provided by the various embodiments, the third-party application client interacts with the platform server for the information related to the user ID by using the token, thereby solving the problem in the prior art that only the registering operation is omitted and other accumulated resources or information of the user for service provider A cannot be used continuously. The third-party application client may interact with the platform server for the information related to the user ID by using the token so that other resources or information of the user accumulated for the platform server can be used by the third-party application client continuously. In addition, the third-party application client obtains the user information and/or the buddy relationship chain from the platform server via the token and sends the third-party information to the platform server via the token so that the resources and information accumulated by the user for the third-party application client and the platform server, respectively, are shared in the authorization scope.

In addition, the third-party application client and the user client call each other by using the open ID so that information is shared between the third-party application client and the user client.

It should be noted that, when the system provided by the above embodiments performs the authorization and authentication, the modules may be distributed according to embodiment descriptions or may change correspondingly to locate in one or more devices different from the embodiment. The modules in the above embodiments may be merged into one module or may be divided into multiple sub-modules furthermore. In addition, the authorization authentication system and the authorization authentication method provided by the above examples belongs to the same idea, and a specific implementation procedure may refer to the method example and will not be described herein.

Sequence number in above embodiments of the present disclosure is only used for descriptions and does not demonstrate a good, better embodiment.

Those skilled in the art will understand that all or part of the steps in the methods provided by the examples of the present disclosure can be implemented by hardware or by instructing related hardware by a program, the program may be stored in a readable memory of a computer, and the memory includes a ROM, a disk, a Compact Disc (CD), and so on.

The foregoing are only preferred embodiments of the present disclosure, and the protection scope of the present disclosure is not limited to this. Any improvement and replacement which can be made in the technical scope disclosed by the present disclosure by those skilled in the art should be covered in the protection scope of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. An authorization authentication method performed by a processor of a third-party application client, the processor executing instructions stored in a memory, the method comprising:

sending an authorization request to a user client operated by a user, the authorization request comprising an application identifier (ID) of the third-party application client, wherein the user client sends, to a platform server, the application ID and a user ID of the user client, in response to receiving, from a user, an authorization instruction for authorizing the third-party application client, and the platform server sends an authorization code to the user client, based on the application ID and the user ID that are sent by the user client;

receiving, from the user client, the authorization code sent by the platform server;

sending, to the platform server, the application ID of the third-party application client and the authorization code received from the user client, wherein the platform server obtains a token for the third-party application client, based on the application ID and the authorization code that are sent by the third-party application client;

receiving, from the platform server, the token generated by the platform server;

receiving an open ID from the platform server, wherein the platform server generates the open ID, based on the application ID of the third-party application client and the user ID of the user client, and the open ID is used to replace the user ID in the third-party application client such that the open ID and user ID each uniquely identify the user of the user client to other users;

storing the open ID received from the platform server, and associating, with the token received from the platform server, the open ID received from the platform server;

calling the user client, based on the open ID stored and associated with the token, or being called by the user client, based on the open ID stored and associated with the token; and interacting with the platform server for information related to the user ID of the user client, via the token received from the platform server.

2. The method according to claim 1, wherein the interacting comprises:

obtaining, from the platform server, user information related to the user ID, via the token received from the platform server, wherein the user information comprises any one or any combination of a nickname, an avatar and a signature;

obtaining, from the platform server, a buddy relationship chain related to the user ID, via the token received from the platform server; and sending, to the platform server, third-party information related to the user ID, via the token received from the platform server, wherein the third-party information comprises information related to the third-party application client.

3. The method according to claim 2, wherein the obtaining the user information related to the user ID comprises:

sending, to the platform server, a request for a user information interface, the request comprising the token received from the platform server and the open ID stored and associated with the token, wherein the platform server determines whether the token has a permission to call the user information interface for which the request is sent, and returns, to the third-party application client, and information corresponding to the open ID, in response to the token being determined to have the permission to call the user information interface; and storing the user information corresponding to the open ID that is returned by the platform server.

4. The method according to claim 2, wherein the obtaining the buddy relationship chain related to the user ID comprises:

sending, to the platform server, a request for a buddy relationship chain interface, the request comprising to the token received from the platform server and the open ID stored and associated with the token, wherein the platform server determines whether the token has a permission to call the buddy relationship chain interface for which the request is sent, and returns, to the third-party application client, an open ID of at least one buddy, in response to the token being determined to have the permission to call the buddy relationship chain interface, and the at least one buddy authorizes the third-party application client and is comprised in an original buddy relationship chain corresponding to the open ID stored and associated with the token; and storing the open ID of the at least one buddy that is returned by the platform server, as a buddy relationship chain of the open ID stored and associated with the token.

5. The method according to claim 4, further comprising, after the storing the open ID of the at least one buddy:

obtaining attribution values respectively corresponding to the open ID stored and associated with the token and the open ID of the at least one buddy; and creating an attribute ranking, based on the attribution values that are obtained.

6. The method according to claim 2, wherein the sending the third-party information related to the user ID comprises:

sending, to the platform server, a request for an information sending interface, in response to the third-party information needing to be sent, the request comprising the token received from the platform server and the open ID stored and associated with the token, wherein the platform server determines whether the token has a permission to call the information sending interface for which the request is sent, and sends the third-party information to at least one buddy, and the at least one buddy authorizes the third-party application client and is comprised in an original buddy relationship chain corresponding to the open ID stored and associated with the token.

7. The method according to claim 1, wherein the calling or the being called comprises:

sending, to the user client, a request for calling the user client, the request comprising the open ID stored and associated with the token, wherein the user client determines whether the open ID sent by the third-party application client is identical with an open ID associated with a current user ID, and responds to the request for calling the user client, in response to the open ID sent by the third-party application client being determined to be identical with the open ID associated with the current user ID, and the current user ID is an identifier of a user currently logging on the user client.

8. The method according to claim 1, wherein the calling or the being called comprises:

receiving, from the user client, a request for calling the third-party application client, the request comprising an open ID associated with a current user ID;

determining whether the open ID associated with the current user ID is identical with the open ID stored and associated with the token;

responding to the request for calling the third-party application client, in response to the open ID associated with the current user ID being determined to be identical with the open ID stored associated with the token;

the current user ID is an identifier of a user currently logging on the user client.

9. The method according to claim 1, wherein the user client:

displays an interface showing contents of an authorization that is requested by the third-party application client, based on the authorization request sent by the third-party application client, the interface being for receiving the authorization instruction for authorizing the third-party application client; and receives, via the interface, the authorization instruction, from the user.

10. An authorization authentication method performed by a processor of a platform server, the processor executing instructions stored in a memory, the method comprising:

receiving, from a user client operated by a user, an application identifier (ID) of a third-party application client and a user ID of the user client, wherein the user client receives an authorization request from the third-party application client, the authorization request comprising the application ID, and sends, to the platform server, the application ID and the user ID, in response to receiving, from a user, an authorization instruction for authorizing the third-party application client;

sending an authorization code to the user client, based on the application ID and the user ID that are received from the user client, wherein the user client sends, to the third-party application client, the authorization code sent by the platform server;

receiving, from the third-party application client, the application ID of the third-party application client and the authorization code sent by the user client;

obtaining a token for the third-party application client, based on the application ID and the authorization code that are received from the third-party application client;

sending, to the third-party application client, the token that is obtained;

generating an open ID, based on the application ID of the third-party application client and the user ID of the user client, wherein the open ID is used to replace the user ID in the third-party application client such that the open ID and user ID each uniquely identify a user of the user client to other users;

sending the open ID to the third-party application client, wherein the third-party application client stores the open ID sent by the platform server, and associates, with the token that is obtained, the open ID sent by the platform server;

sending the open ID to the user client, wherein the user client stores the open ID sent by the platform server, and associates, with the user ID of the user client, the open ID sent by the platform server; and interacting with the third-party application client for information related to the user ID of the user client, via the token that is obtained.

11. The method according to claim 10, wherein the interacting comprises:

providing, to the third-party application client, user information related to the user ID, via the token that is obtained and the open ID, wherein the user information comprises any one or any combination of a nickname, an avatar and a signature;

providing, to the third-party application client, a buddy relationship chain related to the user ID, via the token that is obtained and the open ID; and receiving, from the third-party application client, and processing third-party information related to the user ID, via the token that is obtained and the open ID, wherein the third-party information comprises information related to the third-party application client.

12. A third-party application client, comprising:
a non-transitory memory; and
a processor communicating with the memory, the memory storing instructions that when executed by the processor cause the third-party application client to:
send an authorization request to a user client operated by a user, the authorization request comprising an application ID of the third-party application client, wherein the user client sends, to a platform server, the application ID and a user ID of the user client, in response to receiving, from a user, an authorization instruction for authorizing the third-party application client, and the platform server sends an authorization code to the user client, based on the application ID and the user ID that are sent by the user client;
receive, from the user client, the authorization code sent by the platform server;
send, to the platform server, the application ID of the third-party application client and the authorization code received from the user client, wherein the platform server obtains a token for the third-party application client, based on the application ID and the authorization code that are sent by the third-party application client;
receive, from the platform server, the token generated by the platform server;
receive an open ID from the platform server, wherein the platform server generates the open ID, based on the application ID of the third-party application client and the user ID of the user client, and the open ID is used to replace the user ID in the third-party application client such that the open ID and user ID each uniquely identify the user of the user client to other users;
store the open ID received from the platform server, and associate, with the token received from the platform server, the open ID received from the platform server;
call the user client, based on the open ID stored and associated with the token, or be called by the user client, based on the open ID stored and associated with the token; and
interact with the platform server for information related to the user ID of the user client, via the token received from the platform server.

13. The third-party application client according to claim 12, wherein the memory is further configured to store the instructions that when executed by the processor cause the third-party application client to:
obtain, from the platform server, user information related to the user ID, via the token received from the platform server and the open ID stored and associated with the token, wherein the user information comprises any one or any combination of a nickname, an avatar and a signature;
obtain, from the platform server, a buddy relationship chain related to the user ID, via the token received from the platform server and the open ID stored and associated with the token; and
send, to the platform server, third-party information related to the user ID, via the token received from the platform server and the open ID stored and associated with the token, wherein the third-party information comprises information related to the third-party application client.

14. The third-party application client according to claim 12, wherein the memory is further configured to store the instructions that when executed by the processor cause the third-party application client to:
send, to the user client, a request for calling the user client, the request comprising the open ID stored and associated with the token, wherein the user client determines whether the open ID sent by the third-party application client is identical with an open ID associated with a current user ID, and responds to the request for calling the user client, in response to the open ID sent by the third-party application client being determined to be identical with the open ID associated with the current user ID, and;
the current user ID is an identifier of a user currently logging on the user client.

15. The third-party application client according to claim 12, wherein the memory is further configured to store the instructions that when executed by the processor cause the third-party application client to:
receive, from the user client, a request for calling the third-party application client, comprising an open ID associated with a current user ID;
determine whether the open ID associated with the current user ID is identical with the open ID stored and associated with the token; and
respond to the request for calling the third-party application client, in response to the open ID associated with the current user ID being determined to be identical with the open ID stored and associated with the token, and;
the current user ID is an identifier of a user currently logging on the user client.

16. A platform server comprising:
a non-transitory memory; and
a processor communicating with the memory, the memory storing instructions that when executed by the processor cause the platform server to:
receive, from a user client operated by a user, an application identifier (ID) of a third-party application client and a user ID of the user client, wherein the user client receives an authorization request from the third-party application client, the authorization request comprising the application ID, and sends, to the platform server, the application ID and the user ID, in response to receiving, from a user, an authorization instruction for authorizing the third-party application client;
send an authorization code to the user client, based on the application ID and the user ID that are received from the user client, wherein the user client sends, to the third-party application client, the authorization code that is sent by the platform server;
receive, from the third-party application client, the application ID of the third-party application client and the authorization code sent by the user client;
obtain a token for the third-party application client, based on the application ID and the authorization code that are received from the third-party application client;
send, to the third-party application client, the token that is obtained; and interact with the third-party application client for information related to the user ID of the user client, via the token that is obtained;

generate an open ID, based on the application ID of the third-party application client and the user ID of the user client, wherein the open ID is used to replace the user ID in the third-party application client such that the open ID and user ID each uniquely identify the user of the user client to other users;

send the open ID to the third-party application client, wherein the third-party application client stores the open ID sent by the platform server, and associate, with the token that is obtained, the open ID sent by the platform server; and send the open ID to the user client, wherein the user client stores the open ID sent by the platform server, and associate, with the user ID of the user client, the open ID sent by the platform server.

17. The platform server according to claim 16, wherein the memory is further configured to store the instructions that when executed by the processor cause the platform server to:

provide, to the third-party application client, user information related to the user ID, via the token that is obtained and the open ID, wherein the user information comprises any one or any combination of a nickname, an avatar and a signature;

provide, to the third-party application client, a buddy relationship chain related to the user ID, via the token that is obtained and the open ID; and receive, from the third-party application client, and process third-party information related to the user ID, via the token that is obtained and the open ID, wherein the third-party information comprises information related to the third-party application client.

* * * * *